United States Patent Office 3,257,580
Patented June 21, 1966

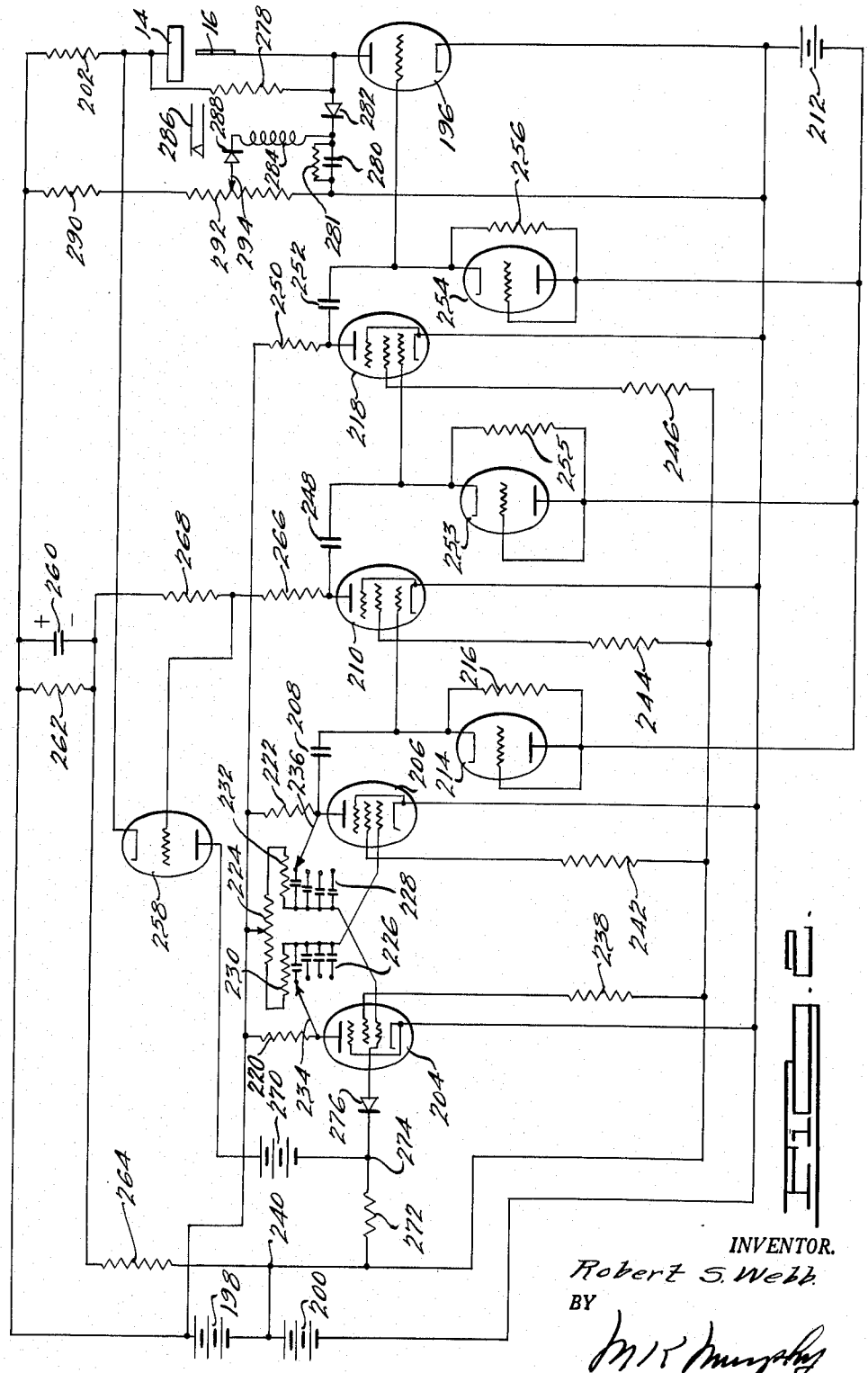

3,257,580
FAULT DETECTION AND CUT-OFF CIRCUIT FOR ELECTRICAL DISCHARGE MACHINING APPARATUS
Robert S. Webb, Bloomfield Hills, Mich., assignor to Elox Corporation of Michigan, Troy, Mich., a corporation of Michigan
Filed May 26, 1961, Ser. No. 112,982
15 Claims. (Cl. 315—127)

This invention relates to electrical discharge machining and particularly to improved machining power circuits therefor.

Electrical discharge machining, sometimes referred to in the art as EDM, spark machining, or arc machining is carried on by passing a series of discrete, localized, extremely high current density discharges across a gap between a conductive tool electrode and workpiece at sonic or ultrasonic frequencies in the presence of a dielectric fluid for eroding the workpiece.

In electrical discharge machining the conductive tool is usually maintained in proximate position with the workpiece by an automatic servo-feed and is advanced toward or into the workpiece as stock is removed therefrom.

A fluid coolant, usually a liquid, is circulated through the working gap to flush the eroded particles from the gap and is sometimes furnished under pressure by a pump through a pattern of holes in the electrode. The defining characteristic of electrical discharge machining is that the coolant is a dielectric such as kerosene, transformer oil or pure water and is broken down in minute, localized areas by the action of the machining power supply between the closest points of the tool and work.

The present status of the electrical discharge machining art has advanced to the point where extremely complex electronically controlled power circuits such as shown in Matulaitus and Lobur Patent No. 2,951,969, issued September 6, 1960, operated in conjunction with an advanced servo feed circuit including a highly developed amplifier such as shown in my Patent No. 2,962,630, issued November 29, 1960, have become the minimum standard of the American industry. The major portion of equipment presently in use in the field employs an electronically switched machining power circuit at least as good as the one outlined in the above mentioned patent.

The best commercial machines today employ an electronically switched machining power circuit, such as that which may employ vacuum tubes or transistors or other newly developed switching devices for precise control of machining discharge duration and repetition rate. The majority of such amplifiers are pulse driven with a nearly rectangular drive such that their output appears as a series of power pulses having the desired characteristics of voltage, power level, duration and repetition rate for precisely controlled electrical discharge machining. When operating properly, precisely controlled machining power circuits of this type produce extremely fine surface finishes at highly practical machining rates.

Since these advanced circuits are controlled by electronic switches the circuits are subject to the malfunction of these high power electronic switches.

This disclosure contains reference to transistors or vacuum tubes, or other "electronic switches." It follows that with proper redesign of the circuit any "electronic switch" may be substituted. By "electronic switch" is mean any electronic control device having three or more terminals consisting of at least two terminals acting as a switch in the power circuit, the conductivity between said power terminals being controlled by a control element within the switch responsive to drive from an external control circuit whereby the conductivity of the power circuit is controlled statically or electrically without movement of mechanical elements within the switch.

A common malfunction in electrical discharge machining power circuits of any type is continuous discharge across the gap as a result of failure of proper switching. This continuous discharge does not permit transfer of the discharge from point to point as is required for normal machining. It is not uncommon for the high power electronic switches employed in these advanced power circuits to become permanently partially conductive, or to permit continuous leakage through the device. A number of error conditions can result in partial or complete short circuiting of the device which produces undesirable continuous discharge across the gap thereby severely damaging the electrode and work. This failure of the device can occur from failure of the bias supply, partial short circuiting of the device itself due to internal damage, thermal runaway, voltage transients, or other circuit malfunctions.

Accordingly, it is the principal object of this invention to provide a device for detecting partial failure or tendency toward total failure of the electronic switch and for interrupting the machining power circuit thereby preventing damage to the electrode or workpiece, and frequently permitting full recovery of the electronic switch after the cause of the malfunction has been eliminated.

Other objects and advantages are disclosed in the following specification, which taken in conjunction with the accompanying drawings show preferred forms of practicing the invention.

In the drawings in which reference numerals have been used to designate like parts herein referred to:

FIG. 2 is a similar circuit usually of higher frequency, higher voltage characteristics, employing vacuum tubes in the switching device and a modified form of the protection circuit.

Figure 1:
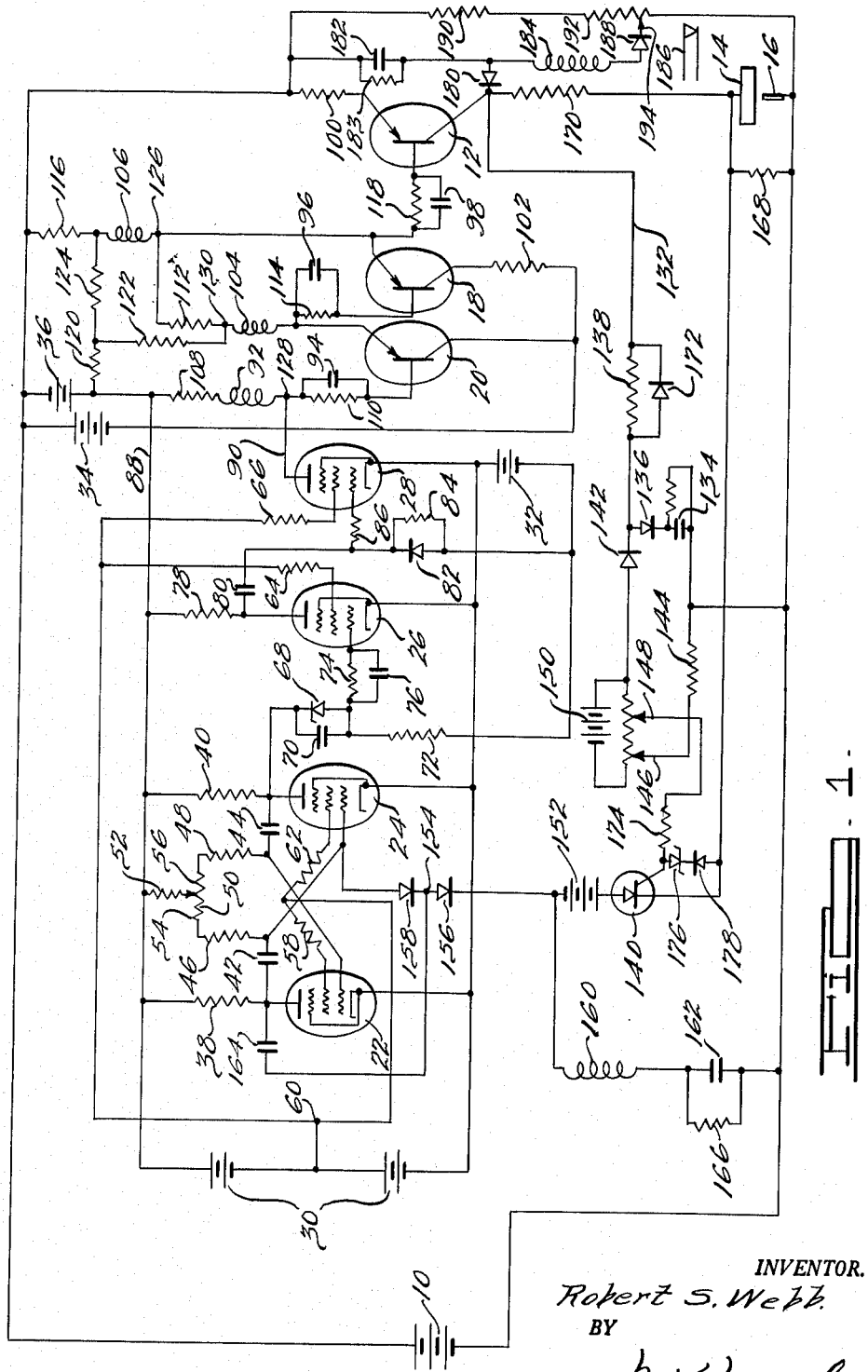
FIG. 1 shows an advanced form of machining power circuit including transistors as the electronic switch and embodying the present invention.

Referring now to FIG. 1, the machining power supply 10 is electronically switched by power transistor 12 for controlling the pulse duration and frequency of discharge across the gap between the workpiece 14 and electrode 16. Power transistor 12 represents a bank of transistors, sometimes hundreds in number, depending on the machining power circuit required.

PNP transistors 18 and 20 are preamplifiers for driving the base of transistor 12 with the extremely high drive current required for a large bank of transistors. The rectangular pulse signal derived from multivibrator tubes 22 and 24 is preamplified in pentodes 26 and 28 which again may be banks of vacuum tubes to present rectangular drive of suitable power to the preamplifier transistors.

Power for the vacuum tube pulser and preamplifier is derived from plate supply 30 and bias 32. Drive power for the transistor preamplifier is obtained from transistor drive power supply 34. Transistor bias supply 36 is provided for biasing the transistors during periods of non-conduction just as bias 32 is provided for the vacuum tube preamplifier.

Multivibrator pentodes 22 and 24 have output signal resistors 38 and 40 connecting the anodes of the multivibrator tubes to the positive terminal of the plate supply voltage 30. The control grids of tubes 22 and 24 are cross-connected respectively through coupling capacitors 42 and 44 to the anodes of the opposing tube, and grid current limiting resistors 46 and 48 are connected as shown to rheostat 50, which, in combination with these two resistors and coupling capacitors 42 and 44, determines the time constant of operation of the multivibrator. The adjustable tap of rheostat 50 is connected through balancing resistor 52 to the positive terminal of supply 30.

This novel grid return of the multivibrator is extremely important in a modern electrical discharge machining power circuit because of the wide range of ON-OFF ratio required at a particular frequency. It is desirable to have the machine maintain selected constant frequency and have a widely adjustable ON-OFF ratio at that particular frequency. This is achieved through the novel grid return rheostat 50.

As the adjustable tap on rheostat 50 is moved from side-to-side a decrease in resistance 54 on one side of the tap, increases resistance 56 on the other side thereby maintaining constant total grid resistance even though each grid circuit varies widely.

It is well known in multivibrator design that the operating period of a multivibrator may be represented by the formula:

$$t = K[C42(R48+R56)+C44(R46+R54)]$$

If coupling capacitors 42 and 44 are equal, the formula may be simplified to:

$$t = K_1(R48+R50+R46)$$

From this simplified formula, it can be seen that as the tap on rheostat 50 is moved from one extreme to the other, resistance is similarly moved from one grid return to the opposing grid return, thereby maintaining a constant frequency regardless of the position of rheostat 50.

The screen grid of pentode 22 is connected through resistor 58 to tap 60 on plate supply 30. Similarly, resistor 62 connects the screen of tube 24 to that same supply, just as resistors 64 and 66 return the screens of tubes 26 and 28 respectively to the screen grid tap of the plate supply.

Another important characteristic of this circuit is shown in the means of coupling the output signal of the multivibrator to the control grid of amplifier 26. As mentioned above, wide ratios of adjustment of ON-OFF ratio are required in a present day machine, particularly with regard to the minimum ON-time or output pulse duration of transistor bank 12. Analysis of this circuit will show that multivibrator tube 24 and power transistor 12 are ON, or rendered conductive, in phase. For extremely short or narrow ON-times, insufficient power is transferred through a coupling capacitor and therefore an improved circuit is required to properly couple the output of the multivibrator to amplifier tube 26.

This improved coupling circuit is achieved through use of a reference diode 68 and shunt capacitor 70 for referencing the rectangular or pulse output developed across signal resistor 40 downward as is required for proper control of the grid of amplifier 26. Bias return resistor 72 is provided to maintain tube 26 biased OFF during nonconducting portions of its cycle.

As multivibrator tube 24 becomes conductive, a voltage drop occurs across signal resistor 40. A typical value for plate supply voltage 30 is approximately 250 volts and the drop across multivibrator tube 24 during conduction is approximately 100 volts, therefore generating a signal of approximately 150 volts across resistor 40.

As long as the regulated voltage of reference diode 68 is larger than the drop across tube 24, the control grid of tube 24 will at this time, be negative. In the example given, this reference diode would have a magnitude of regulation of approximately 200 volts, and the control grid of tube 26 would therefore be biased to approximately minus 100 volts. Reference diode 68 and capacitor 70 form a network for a floating voltage supply having almost no capacitive losses during switching as would be encountered if a D.-C. supply were developed and employed at this point with the high frequency passing characteristics required for sharp rise and fall of drive signal.

As multivibrator tube 24 becomes nonconductive, the voltage signal across resistor 40 disappears, thereby carrying the reference diode circuit positive. In this example, with a 250 volt plate supply and a 200 volt reference diode, approximately 50 volts is developed across resistor 74 connected in the control grid of tube 26 since the control grid clips the signal at approximately the same voltage as the cathode of tube 26. An extremely small lead capacitor 76 is connected across resistor 74 for improving the sharp rise and fall characteristics of this signal thereby causing amplifier 26 to both amplify and re-square the signal.

Amplifier 26 develops a signal across resistor 78 which is coupled through capacitor 80 and clamping diode 82 to the grid circuit of amplifier 28. Bias return resistor 84 and grid current limiting resistor 86 are provided as shown in a manner widely applied in pulser amplifier circuitry.

Generally the OFF-time or duration between pulses of the output transistor bank is at least 20% of the total signal compared to minimum ON-time of less than 1% of total signal. For such a conduction time of at least 20% for tube 26, sufficient power is transferred through coupling capacitor 80 and a normal coupling circuit may be employed in the grid circuit of amplifier 28.

In coupling the output of the last stage of vacuum tube amplification to the transistor preamplifier, the same problem prevails as in coupling the output of the multivibrator to the first stage of amplification. During narrow portions of conduction of the output transistor bank amplifier tube 28 is also rendered conductive for a narrow portion of each cycle. An additional complication is that transistors are inherently low voltage, high current, devices and when connected in common emitter relationship as shown, require large amounts of drive current compared to a vacuum tube device which is essentially a voltage switch except in the regions of grid current. For this reason, the vacuum tube amplifier is interconnected as shown with the transistor preamplifier such that the positive terminal of plate supply 30 is connected to the positive terminal of bias supply 36 of the transistorized amplifier by lead 88.

Lead 90 is connected to the anode of amplifier 28 and in conjunction with lead 88 presents the signal output of the vacuum tube preamplifier.

At the instant of turn-ON of amplifier tube 28, which usually comprises a bank of vacuum tubes, electron flow is from the negative terminal of supply 30 to the cathode of amplifier 28. From the anode of amplifier 28, this electron flow occurs instantaneously through line 90 and is retarded by the inductance of choke 92. Lead capacitor 94 permits this electron flow to enter the base of first transistor amplifier 20. At this first instant, all transistors are nonconductive and this signal is additionally led from the emitter of transistor 20 through lead capacitor 96, the base-emitter of transistor 18, lead capacitor 98, base-emitter of transistor 12, balancing resistor 100 to the negative terminal of bias 36 and returned from the positive terminal of bias 36 to the positive terminal of the plate supply voltage of 30.

This principle represents a fundamental improvement in this form of circuitry, in that from the first instant of drive, signal is led through each stage of the amplifier tending to render all of the transistors of the amplifier in addition to the output transistor bank conductive at the same instant. After the minute delay time required of transistor 20, it becomes conductive and amplifies signal and causes additional electron flow from the negative terminal of drive supply 34 through the collector-emitter of transistor 20 and additionally through the lead network 96, 98, 12, 100, just like the signal from amplifier tube 28. Similarly, as transistor 18 is rendered conductive, additional amplified signal flows from the negative terminal of supply 34 through limiting resistor 102, the collector-emitter junction of transistor 18 and additionally through the lead network 98, 12. During this period of turn-ON, almost no shunt current flows in the corresponding bias circuits, it being blocked from each bias circuit by chokes 92, 104, 106 respectively. Furthermore, additional acceleration is provided by lead capacitors 94, 96, 98, thereby forcing all transistors sharply into conduction.

As lead capacitors 94, 96, 98 become charged, and as conduction occurs through chokes 92, 104, 106, the circuit achieved steady state conducition. Resistors 108 and 110 are chosen with the voltage considerations in mind such that an approximately equal drive and shunt current flow occurs, the shunt current flowing through choke 92 and resistor 108 after the minute delay interval of choke 92. Similarly, resistors 112 and 114 are chosen in accordance with this principle, to provide equal drive current and shunt bias current during steady-state conditions, as are resistors 116 and 118 respectively in the base circuit of transistor 12.

With the proper choice of these balancing resistors and consideration of the voltage dividers involved in the circuit from bias supply 36, equal drive current and shunt current occurs in the base circuit of each transistor. As tube 28 is rendered sharply nonconductive, choke 92 continues electron flow from choke 92, resistor 108, resistor 120, resistor 122, choke 104, emitter-base of transistor 20, lead capacitor 94. Choke 92 sustains at the instant of turn-OFF a current equal to that flowing through it previously which by design is equal to the forward or drive current. The induced voltage of this choke in addition to the voltage stored across lead capacitor 94 presents a sharp turn-OFF signal through transistor 20, thereby rendering it sharply nonconductive.

In a similar manner, choke 104 forces electron flow through resistor 112, emitter-base of transistor 18 and lead capacitor 96 thereby sharply biasing transistor 18 nonconductive.

Choke 106 similarly forces electron flow through resistor 116, balancing resistor 100, emitter-base of transistor 12, lead capacitor 98, thereby rendering the output transistor bank sharply nonconductive.

An analysis of this circuitry will show that these cascaded chokes "kick" properly in phase to sharply turn-OFF their respective transistors and output signal is divided from these chokes by the divider resistor networks as shown. Thus, a shunt path of electron flow for choke 106, for example, is also through resistors 124, 122, 112, which would tend to cause transistor 18 to remain conductive. Because the base circuit of transistor 18 is returned at point 126, the reflected magnitude of this "kick" is sharply reduced, being equal only to the voltage developed across resistor 112. This voltage resulting from the "kick" of choke 106 is overcome by the "kick" of choke 104 connected in the base circuit of transistor 20 to the anode of tube 28 at point 128. Thus, a portion of the choke voltage induced in each case is fed back to the preceding stage and is overcome by the choke of that preceding stage. Choke 92 and resistor 108 which are of high impedance, characteristic of the vacuum tube circuitry, must conduct to overcome the "kicks" of all the total of chokes 106, 104, in order to sharply bias transistor 20 nonconductive by addition to the bias stored across capacitor 94 during conduction drive.

This unique circuit employing shunt choke drive and the cascaded returns as shown at points 126, 130, 128 forms an extremely sharp pulse drive during turn-ON of the transistor, causing lead of drive current through the transistor network and during turn-OFF, sustaining a sharp high conduction current for the duration of storage time and turn-OFF time of each stage of the transistor amplifier. By proper choice and balancing of these chokes, extremely sharp turn-OFF characteristics can be achieved for each stage of the transistor amplifier and of the entire amplifier as a unit. The degree of interconnection and cascading of this circuit is complex and requires special consideration in the calculation of each choke value and resistance value accordingly.

During periods of static nonconduction in which turn-OFF has been achieved and no current is flowing in the respective base circuits, bias is achieved on each stage of the transistor amplifier through the novel divider shown as resistors 116, 124, 120. Resistors 116, 124 and 120 are of successively higher resistance values, thereby producing a low voltage D.-C. bias on the base of output transistor bank 12 and somewhat higher bias voltages on the bases of transistors 18 and 20 respectively. An additional resistor 122 is shown connecting point 130 with the tap between resistors 124 and 120 to provide bias to transistor 18. By proper selection of resistors 124 and 120, in accordance with the division of signal as previously outlined, this resistor may be eliminated. However, additional voltage is developed across resistor 112 from the induced voltage of choke 106 during turn-OFF unless resistor 122 is properly selected.

Normally, the machining power voltage 10 is very near the peak voltage rating of transistor bank 12, which is rated for voltage from collector to base as well as collector to emitter. By supplying an extremely low bias voltage of low impedance for the base of transistor 12, full advantage may be taken of the voltage ratings of this output transistor switch. Because of the extremely high drive currents required, excess power loss would occur in resistors 102 and 118 except that drive supply 34 is of much lower voltage magnitude than machining power voltage 10. For this reason, higher bias voltages may be employed on transistors 18 and 20 without limitations in output switching.

During a condition of choke-induced voltage, the total voltage from emitter to collector of transistor 18 is that of supplies 34, 36, resistor 116, choke 106, which at that instant is positive at terminal 126, therefore producing a somewhat higher switching voltage during the induced voltage of each of these chokes than the D.-C. voltage of supplies 34, 36. Similarly, the voltage across choke 104 is added to that of 106 in the emitter-collector circuit of transistor 20 thereby producing an even higher switching voltage for this transistor. As mentioned earlier, the total voltage of choke 92 must exceed the sum of the others, however, this is well within the rating of the peak anode voltage of vacuum tube 28 since it is a high voltage device having a rating of several thousand volts rather than the maximum of 100 to 200 volts typical for power transistors of this type.

During pulse operation in which the output transistor bank is rendered sharply conductive and sharply nonconductive, this improved circuitry therefore provides extremely accelerated drive having sharp turn-ON and turn-OFF characteristics vastly improving the normal switching times of the particular transistor without additional loss of switching power.

This circuit includes an improved per pulse short circuit sensing network for sensing abnormally low voltage conditions across the machining gap. As the output transistor bank 12 is rendered sharply conductive, keying lead 132 connects to this cut-OFF circuitry and at this time "keys" it into operation. During periods of conduction, line 132 is connected to the positive terminal of supply 10, less the minute losses in the collector-emitter circuit of transistor 12 and balancing resistor 100. This positive signal at line 132 draws electron flow through delay capacitor 134, diode 136, delay resistance 138. After the delay interval determined by the product of capacitor 134, resistor 138, a portion of this positive or keying signal is presented to the gate circuit of silicon controlled rectifier 140. At this instant, the cathode of diode 142 is carried positive and therefore blocks electron flow. Connected to the negative end of delay capacitor 134 is resistor 144 and a sensing lead returning this network to the negative terminal of supply 10 and also to electrode 16. Since rectifier 142 is blocked at this instant, a keying voltage determined by the difference between taps 146 and 148 from keying supply 150 carries the gate positive with respect to the electrode by the difference in this voltage between 146 and 148.

If after the delay time of network 134, 138, the electrode and workpiece are open circuited or if the machining voltage is above this preset amount, the cathode of controlled rectifier 140 will be more positive than the gate, thereby maintaining the controlled rectifier nonconductive. If a short circuit occurs or if the gap voltage between electrode 16 and workpiece 14 is below this predetermined amount, the gate is keyed positive with respect to the cathode and instantaneously triggers conduction of controlled rectifier 140. This condition corresponds to short circuit or an undesirably low machining voltage across the gap and is a machine malfunction and should be so interrupted.

Conduction of controlled rectifier 140 through cut-off voltage supply 152 carries point 154 sharply negative since the cathode, at this instant, is approximately at the same voltage as electrode 16. Supply 152 is larger in voltage than the net of voltages 10, 36, 30, thereby carrying point 154 more negative in voltage than the cathodes of multivibrator tube 24. As explained earlier, multivibrator tube 24 was conductive during this period of gap conduction caused by switching ON of transistor 12. Carrying point 154 negative with respect to the cathode, causes conduction through diodes 156 and 158 triggering multivibrator tube 24 nonconductive. As this tube is rendered even partially nonconductive the signal becomes regenerative and is amplified by the normal multivibrator action of tube 22 and 24 thus rendering tube 24 sharply nonconductive and interrupting conduction of machining power bank 12 which is course interrupts the flow of power through the machining gap.

Since a negative voltage is required at the anode of controlled rectifier 140 to interrupt the conduction of that device, it is achieved through choke 160 and capacitor 162. During this period of rectifier conduction, capacitor 162 is charged to the voltage of supply 152 through choke 160. Electron flow, in this instance, is through controlled rectifier 140, supply 152, choke 160, capacitor 162, electrode 16, workpiece 14 to the cathode of controlled rectifier 140. This causes a voltage drop across choke 160 inducing a flux field in this choke. As capacitor 162 becomes charged equal to supply 152, the field of choke 160 collapses to sustain conduction thereby overcharging capacitor 162. This capacitor is overcharged to a voltage approximately twice that of supply 152. After collapse of the field of choke 160, this negative voltage stored across capacitor 162 flows back through choke 160 thereby presenting a negative voltage at the anode of controlled rectifier 140 causing it to cease conduction. Additional electron flow occurs from this capacitor into diodes 156, 158 and multivibrator coupling capacitor 44. A shunt electron flow occurs through diode 156 into capacitor 164 which adds to coupling capacitor 44. This larger capacity maintains the grid of tube 24 negative for a longer duration than normal and therefore permits complete recovery of the machining gap. Generally, this capacitor is two to three times the capacity of 44 thereby increasing the OFF-time by this amount. After discharge of capacitor 164 and 44, the multivibrator triggers into conduction in the normal manner and diodes 158 and 156 again block. The time constant of resistor 166 and shunt capacitor 162 is of sufficient duration to cause recovery of the blocking characteristic of controlled rectifier 140.

In a typical electrical discharge machine, a wide variety of frequencies are used and this is achieved through different values of coupling capacitors such as 42, 44 or through changes in resistors 48, 50, 46. This is achieved through switching means and is straightforward and is not shown in the interest of simplicity. In each case, however, where coupling capacitor 44 is switched, OFF-time control capacitor 164 must also be switched to maintain this same approximate time relationship between a failure pulse and a normal conduction pulse. Capacitor 162 and choke 160 conduct relatively higher current than either capacitor 164 or capacitor 44, such that changes in these values of capacitance do not materially affect this turn-OFF circuit.

During normal periods of OFF-time in which controlled rectifier 140 has not fired, bias is maintained on the gate of that rectifier by electron flow through tap 146, resistor 144, resistor 168, resistor 170, keying lead 132, diode 172, diode 142, to the positive terminal of bias supply 150. At this time, the cathode controlled rectifier 140 is returned to resistor 168 and through application of this divider network, the gate is maintained negative at these times. If this negative bias exceeds a rating of the particular device, resistor 174, reference diode 176, diode 178 are provided to additionally clip this signal to within the negative or bias rating of the particular controlled rectifier.

Operation of this complete circuit is therefore within the design considerations in which the output transistor bank is rendered sharply conductive or nonconductive at selected ON-OFF ratio and selected frequency during normal machining, permitting pulsing of the gap at this ON-OFF ratio and precisely controlled machining results. For a constant value of resistance 170 and a constant supply voltage 10, machining current increases in direct proportion to the ON-time at a particular frequency.

In this manner very exact control is achieved of actual machining current. This resistor is sometimes varied to cause a different peak machining current thereby permitting even more accurate adjustment of machining conditions.

The circuitry of FIG. 1 representing the principal subject matter of this invention is the network comprised of components 180 through 194 in FIG. 1. A diode 180 has its cathode connected to the collector of transistor 12 and its anode connected to the negative side of capacitor 182 which is generally an electrolytic storage capacitor. A discharge resistor 183 is connected across capacitor 182. Relay coil 184, having associated normally closed contacts 186, has one end connected to the negative terminal of capacitor 182. The opposite end of relay coil 184 is connected to the anode of diode 188. A potentiometer network, consisting of resistor 190 and potentiometer 192, is connected across supply voltage 10. The cathode of diode 188 is connected to control tap 194 of potentiometer 192.

During any OFF time of transistor 12 substantially the full voltage of supply 10 occurs from emitter to collector of transistor 12 during this blocking condition with the collector of transistor 12 negative with respect to the emitter. During this blocking condition diode 180 conducts sharply to charge capacitor 182 to substantially the full voltage of supply 10. Charging of capacitor 182 occurs from the negative terminal of supply 10 through resistor 168, resistor 170, rectifier 180, capacitor 182, to the positive terminal of supply 10.

The charging characteristic of resistor 168, resistor 170, capacitor 182, must be such that substantially full supply voltage occurs across capacitor 182 during maximum ON time condition or minimum OFF time condition of normal operation of the circuit. This charged condition is determined normally by the balance between series resistors 168, 170 and capacitor discharge resistor 183 to maintain capacitor 182 substantially charged during normal switching conditions. Flow of power from capacitor 182 through relay coil 184 is blocked by diode 188 during this proper full voltage condition of capacitor 182.

Should a circuit malfunction occur, such as failure of bias supply 36 or partial or complete breakdown of transistor 12, transistor 12 does not block during its normal OFF time period and a lower negative voltage is stored across capacitor 182. During a failure condition the average voltage across capacitor 182 is sufficiently below the reference set by potentiometer arm 194 that conduction occurs from reference arm 194, diode 188, relay coil 184, capacitor 182, to energize relay coil 184. Energization of relay coil 184 opens normally closed contacts 186 and disconnects power to supply 10 thereby protecting the electrode and workpiece and the remaining good transistors in bank 12 from damaging short circuit currents.

In a high power transistor amplifier of this type containing many transistors in parallel, it is possible for a condition of partial leakage to occur in one or more transistors causing this protection device to operate. If this partial failure has resulted from thermal runaway of the device rather than complete breakdown, it is possible to prevent permanent damage to the transistor bank permitting full recovery of the machining power circuit. Normally contacts 186 are interlocked with the machine tool control circuitry such that power supply 10 is maintained OFF until the machine operator attempts to restart the cutting cycle.

Referring now to FIG. 2 which shows schematically a direct connected electron tube circuit in which a bank of tubes represented by triode 196 is connected directly to the electrode 16. The workpiece 14 is, in this instance, connected to the positive terminal of the gap power supplies 198 and 200 through resistor 202.

Tube bank 196 has its cathode connected to the negative terminal of voltage supply 200, thus completing the series EDM power circuit which provides erosive pulses across the machining gap controlled by excitation of the grid of the tube bank 196.

In precise machining by EDM, it is imperative that the power tube bank be pulsed ON and OFF at precise, sharply defined intervals. That is to say, the voltage wave form between grid and cathode of tube 196 must be rectangular in form, or as nearly so as can be achieved, such that bank 196 is turned ON and OFF sharply to provide optimum gap discharge. This rectangular pulse drive to the grid of tube 196 is generated by multivibrator tubes 204 and 206 operating according to well known principles of vacuum tube multivibrator design.

It will be seen by further analysis that in this particular circuit the gap in ON or power is supplied to the machining gap when multivibrator tube 204 and tube 196 are ON and power bank 196 and the gap are OFF when multivibrator tube 204 is OFF. The rectangular pulsating output of multivibrator tube 206 is connected through coupling capacitor 208 to the control grid of the buffer tube 210. The pulsating signal is clamped to bias 212 through diode 214 and drive or turn ON signal for tube 210 is developed across resistor 216. The rectangular voltage drive tends to be in excess of bias 212 and the excess portion is clipped by the grid of pentode 210 in a manner well known in the electronics industry as "resquaring of the pulse" such that the output of tube 210 has an even sharper rise and fall voltage drive than the output of the multivibrator. In a similar manner, a tube bank represented by pentode 218 amplifies the output from pentode 210 and signal is again re-squared at the grid of this tube as well as the grid of the power tube bank itself. The output tube bank 196 consists of many vacuum tubes, perhaps hundreds or thousands, and in turn requires a bank in the order of 5 to 50 tubes in order to furnish drive power of sufficient amplitude. The grid circuit of tube bank 196 is therefore supplied with rectangular pulsating power in the order of 50 to 5000 watts or higher, depending on the size of tube bank 196. Rectangular pulsating power even sufficient to drive the grid of power bank 196 is presently not commercially available in the electronics industry. Plate load resistors 220 and 222 develop rectangular multivibrator signal resulting from the cross connection of coupling capacitors in accordance with the setting of multiposition switches 234, 236.

A novel design feature of this particular circuit is in the multivibrator grid return and potentiometer 224. The special characteristic of this particular circuit is that by adjusting potentiometer 224, an increase in resistance in one grid circuit automatically decreases resistance in the other circuit, and an analysis of the respective ON and OFF time of each of the multivibrator tubes and the formulas for determining this, shows how to achieve a fixed output frequency. In other words, for equal size capacitors 226 and 228, the time duration of one complete cycle of operation may be represented by:

$$KC(R44+R46+R38)$$

where $C40=C42$. This is novel and particularly important in an EDM circuit, since a constant frequency of operation may be maintained and the gap ON time may be varied directly with the ON time of multivibrator tube 204 as determined by capacitor 226, resistor 230, and the portion of the potentiometer 224 included in the grid return circuit of multivibrator tube 206. Thus turning the potentiometer to the right, and increasing the resistance in the grid circuit of tube 206 will cause an increase in the ON time of tube 204 and therefore corresponding increase in gap ON time. Since output tube 196 during ON time may be approximated by a resistance, the quantity of machining current permitted in the gap may be controlled by the respective ON time of multivibrator tube 204 and therefore tube bank 196, thus giving precise control of the machining current supplied to the gap and permitting infinitesimal adjustments of that machining current while maintaining a fixed machining frequency.

The screen grid of pentode 204 is connected through limiting resistor 238 to screen voltage tap 240. Similarly, the screen grid of pentode 206 is connected through resistor 242, the screen grid of pentode 210 is connected through resistor 244 and the screen grid of pentode 218 through resistor 246, each to screen voltage tap 240. The output of tube 210 is coupled through capacitor 248 to the grid circuit of tube 218.

Amplified output of tube 218 is developed across plate load resistor 250 and coupled through capacitor 252 to the grid circuit of tube 196.

It will be understood that clamping diodes 253 and 254 which are shunted by the signal resistors 255, 256, respectively, perform a function similar to tube 214 and resistor 216 in clamping the amplified pulsating signal to bias voltage 212.

Consider next the particular operation of the current sensitive per pulse cut-off tube and its associated circuitry. The operation of this circuitry as power tube bank 196 is pulsed ON, is such that it is capable of supplying power to the machining gap. Prior to the machining pulse, multivibrator tube 204, buffer tube 210 and power tube bank 196 are all cut-off or nonconducting. Per pulse cut-off tube 258 is rendered nonconductive by the D.-C. bias stored across capacitor 260 developed by voltage dividing resistors 262 and 264. With cut-off tube 258 nonconductive, operation of the multivibrator is unimpaired and as multivibrator tube 204 turns ON, buffer tube 210 is rendered conductive. Included in the plate circuit of tube 210 is dividing resistor 266 and keying resistor 268 connected in the grid circuit of cut-off tube 258. Assuming a condition of open circuit, the full open circuit voltage is generated across the working gap and therefore almost no voltage drop occurs across resistor 202. The cathode of tube 258 is at that instant effectively connected to the positive terminal of supply 198 and the bias stored in capacitor 260 maintains tube 258 nonconductive. Signal is developed across resistor 268 in the grid lead of cut-off tube 258. This signal is of such a polarity tending to bias tube 258 further nonconductive and in the absence of voltage across resistor 202 maintains tube 258 nonconductive. The presence of a portion of the conduction voltage at the cathode of tube 258 cancels this keying signal corresponding to a gap voltage above the minimum required or a gap current below the maximum limit and the cut-off tube remains nonconductive and operation of the circuit is unimpaired and proceeds in accordance with the normal functions of multivibrator tubes 204 and 206.

If the working gap is shorted or is a low enough voltage such that the signal developed across resistor 202 is larger than the keying voltage across resistor 268, cut-off tube 258 becomes instantaneously conductive. Conduction of the cut-off tube causes electron flow from the negative terminal of floating D.-C. supply voltage 270 through resistor 272 to screen voltage tap 240 of the main D.-C. power supply. The voltage generated across resistor 272 is substantially in excess of that of screen voltage tap 240 thus causing terminal 274 to become negative with respect to the cathode of tube 204. Terminal 274 is rendered sufficiently negative to interrupt conduction of multivibrator tube 204 and trigger the OFF portion of the cycle. During the period of conduction, tube 204 was ON and in-phase with power tube bank 196. Thus, as cut-off tube 258 renders tube 204 nonconductive, the amplifier instantaneously renders power tube bank 196 nonconductive interrupting the condition of short circuit or low voltage gap conduction or excess current flow. This interruption lasts for the normal duration of OFF time or dwell between pulses as determined by multivibrator grid circuit 228, 232, 224, of tube 204. In this manner, the flaw or short circuit in the working gap instantaneously interrupts the particular machining cycle. During normal operation of this circuit of multivibrator tube 204 is isolated from the cut-off circuitry by diode 276, said diode becoming conductive only during periods of operation of cut-off tube 258, at which time terminal 274 is more negative than either the cathode or grid of tube 204.

FIG. 2 embodies a leakage detection device which is comprised of resistor 278 connected from workpiece 14 to electrode 16, storage capacitor 280 and shunt resistor 281 connected through diode 282 across vacuum tube bank 196. Relay coil 284 and normally closed contacts 286 correspond to relay coil 184 and contacts 186 of FIG. 1. Diode 288 similarly connects to the voltage network formed by resistor 290 and potentiometer 292 through adjustable tap 294 of potentiometer 292.

Operation of the leakage detection circuitry of FIG. 2 is nearly identical to that of FIG. 1. During normal periods of OFF time of tube bank 196 capacitor 280 is charged from power supply voltage 198 and 200 through diode 282, resistor 278 and resistor 202. Resistor 278 is, of course, many times larger than resistor 202 and at the instant of initial charging of capacitor 280 substantially the full voltage of supplies 198 and 200 exists across resistor 278. The balance of resistor 278 and resistor 281 is chosen in accordance with the principles described in FIG. 1 such that substantially full voltage of supplies 198 and 200 exists across capacitor 280 during normal operation. Discharge of capacitor 280 through relay coil 284 is blocked by diode 288. Energization of relay coil 284 occurs when the blocking of tube 196 is sufficiently poor due to high leakage such that capacitor 280 is not substantially charged. At that time electron flow occurs through capacitor 280, relay coil 284, diode 288, thus energizing relay coil 284 and opening contacts 286. Operation of this circuit is identical to that of FIG. 1 and opening of contacts 286 serves the same function as opening of contacts 186 by interrupting power to machining power supplies 198 and 200.

Each of these circuits of FIG. 1 and FIG. 2 is designed such that the threshold of operation occurs at a desired maximum leakage level across the electronic switch maintaining the residual voltage across the storage capacitor to the threshold level. Partial conduction can occur through the relay coils without energization thereof and potentiometer arms 194 and 294 are adjusted such that pull in current occurs through the respective relay coils during a condition of maximum permissible leakage of the particular electronic switch. In any case this maximum permissible leakage is several hundred times less than actual machining current and the safety device operates before any damage occurs to the electrode, workpiece or power circuitry.

In the above examples, the electrode is shown as connected to the negative output of the machining power supply and the workpiece to the positive output. Present day knowledge indicates that in certain specialized and improved forms of machining that polarity may be reversed. It is essential in each case that discrete pulses of the same polarity be applied in each case and that polarity be selected in accordance with known principles. The above examples apply equally well to either polarity of machining.

In the above drawings, the D.-C. supplies are shown as batteries in the interest of simplifying the disclosure. In actual practice, these sources of D.-C. are derived from the secondary of a transformer having its primary connected to the power source for the machine which may be single phase or polyphase A.-C. The secondary voltage is rectified and stored, usually in an electrolytic storage capacitor to form a nearly ideal D.-C. source having very low internal impedance.

From the above examples it can be seen that I have shown a malfunction protection circuit for an advanced type electrical discharge machining power circuit. The circuits in the above example employ a relay as the control device. It would be equally possible to employ an electronic switch in place of the relay for more rapid operation of the interruption function. The important concept of this invention is the detection of leakage of the electronic switch and the interruption of machine power in response to this malfunction. It is not intended to limit the invention to the specific disclosure of the above circuitry which are shown as examples but only as set forth in the following claims.

I claim:

1. In an electrical machining apparatus having an electronic switch including a pair of power electrodes, said power electrodes connected between a power source and an operative portion of the apparatus, means for pulsing said electronic switch alternately conductive and nonconductive at selected frequency, means for detecting leakage through the power electrode of said electronic switch during its nonconducting period of operation, and cut-off means operable in response to detection of leakage of predetermined amount by said detecting means for cutting off said power source.

2. The combination set forth in claim 1 wherein said detecting means comprises an RC network connected between the power electrodes of said switch, a one-way current conducting device connected in series with said network, and means for charging said RC network in response to predetermined leakage through said electronic switch during its nonconducting period.

3. The combination set forth in claim 2 wherein said charging means includes a charging resistor connected to said power source.

4. The combination set forth in claim 1 wherein said cut-off means comprises an electromagnetic switch having its coil operatively connected to said detecting means.

5. In an apparatus for machining a conductive workpiece by means of intermittent electrical discharge across a dielectric coolant filled gap between a tool electrode and the workpiece comprising, a source of power, an electronic switch having a control electrode and having its power electrodes operatively connected to said source and said gap, means for pulsing said control electrode of said electronic switch to render it alternately conductive and nonconductive to provide electrical discharge across said gap, means for detecting leakage through said power electrodes of said switch during its non-conductive period of operation, and cut-off means operatively connected to said detecting means and operable in response to detection of leakage of predetermined amount by said detecting means to interrupt said power source.

6. The combination as set forth in claim 5 wherein said leakage detecting means comprise a series capacitor-diode network operatively connected between at least one principal electrode of said switch and said cut-off means.

7. The combination as set forth in claim 5 wherein said cut-off means comprises a control coil for an electro-magnetic relay, said relay having its contacts operatively connected to and controlling said power source.

8. In an apparatus for machining a conductive workpiece by means of intermittent electrical discharge across a dielectric coolant filled gap between a tool electrode and the workpiece comprising, a source of power, an electronic switch having a control electrode and having its power electrodes operatively connected to said source and said gap, means for pulsing said control electrode of said switch to render it alternately conductive and nonconductive to provide electrical discharge across said gap, a series diode-capacitor network operatively connected to at least one principal electrode of said switch to detect leakage between said power electrodes of said switch, and a cut-off means operatively connected between said network and said source, said cut-off means operable to interrupt power from said source responsive to leakage between said principal electrodes in excess of a predetermined amount.

9. Apparatus for machining a conductive workpiece by means of intermittent electrical discharge across a dielectric coolant filled gap between an electrode and the workpiece comprising, a source of machining power, an electronic switch having a pair of power electrodes, said power electrodes connected between said power source and said gap, a pulser operably associated with said electronic switch for rendering said switch alternately conductive and nonconductive, means for detecting leakage through said electronic switch during its nonconductive period and for initiating disconnect of said power source responsive thereto comprising, a capacitor connected across the power electrodes of said electronic switch through a one-way current conducting device, and means for charging said capacitor including a charging resistor connected between said power source and said network.

10. The combination set forth in claim 9 wherein said charging resistor is a relatively high impedance resistor compared to the impedance of said switch during its conductive period.

11. Apparatus for machining a conductive workpiece by means of intermittent electrical discharge across a dielectric coolant filled gap between an electrode and the workpiece comprising, a source of machining power, an electronic switch having a pair of power electrodes, said power electrodes connected between said power source and said gap, a pulser operably associated with said electronic switch for rendering said switch alternately conductive and nonconductive, means for cutting off said power source in response to leakage of predetermined amount through the power electrodes of said electronic switch comprising, an electromagnetic cut-off switch having a set of contacts, a coil operable to actuate said contacts in response to predetermined leakage through said electronic switch.

12. The combination set forth in claim 11 wherein said switch consists of a bank of electronic tubes and said detecting means is connected between the paralleled anodes and cathodes thereof.

13. The combination set forth in claim 11 wherein said switch consists of a bank of transistors and said detecting means is connected between the paralleled collectors and emitters thereof.

14. In an electrical machining apparatus having an electronic switch including a pair of power electrodes, said power electrodes connected between a power source and an operative portion of the apparatus, means for pulsing said electronic switch alternately conductive and nonconductive at selected frequency, means for detecting the leakage between the power electrodes of said electronic switch during its nonconductive period of operation, and cut-off means operatively connected to said detecting means and operable in response to detection of leakage of predetermined amount by said detecting means for cut-off of said power source, said cut-off means including an electro-magnetic coil connected to a reference voltage through a one-way current conducting device.

15. Apparatus for machining a conductive workpiece by means of intermittent electrical discharge across a dielectric coolant filled gap between an electrode and the workpiece comprising, a source of machining power, an electronic switch having a pair of power electrodes, said power electrodes connected between said power source and said gap, a pulser operably associated with said electronic switch for rendering said switch alternately conductive and nonconductive, means for cutting off said power source in response to leakage of predetermined amount through the power electrodes of said electronic switch comprising, cut-off means having a set of contacts, means for actuating said contacts responsive to its selected excitation, and an RC network operatively connected to said last-mentioned means for causing its excitation responsive to predetermined leakage through said electronic switch.

References Cited by the Examiner

UNITED STATES PATENTS 2,951,959  9/1960  Matulaitis et al. _____ 315—227
3,018,411  1/1962  Webb _____ 315—227

References Cited by the Applicant

UNITED STATES PATENTS 2,866,921  12/1958  Matulaitis et al.

JOHN W. HUCKERT, *Primary Examiner.*

RALPH G. NILSON, *Examiner.*

C. R. CAMPBELL, R. SANDLER, *Assistant Examiners.*